(12) United States Patent
Arminjon

(10) Patent No.: US 11,236,660 B2
(45) Date of Patent: Feb. 1, 2022

(54) SEALING GASKET, FOR SEALING THE CONNECTION BETWEEN AN EXHAUST MANIFOLD AND A TURBINE

(71) Applicant: Volvo Truck Corporation, Gothenburg (SE)

(72) Inventor: Antoine Arminjon, Brignais (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/955,941

(22) PCT Filed: Dec. 20, 2017

(86) PCT No.: PCT/IB2017/001755
§ 371 (c)(1),
(2) Date: Jun. 19, 2020

(87) PCT Pub. No.: WO2019/122947
PCT Pub. Date: Jun. 27, 2019

(65) Prior Publication Data
US 2020/0325812 A1 Oct. 15, 2020

(51) Int. Cl.
*F01N 13/10* (2010.01)
*F01N 13/18* (2010.01)
(Continued)

(52) U.S. Cl.
CPC ......... *F01N 13/10* (2013.01); *F01N 13/1827* (2013.01); *F02B 37/00* (2013.01); *F16J 15/0818* (2013.01); *F02B 37/025* (2013.01)

(58) Field of Classification Search
CPC ...... F01N 13/10; F01N 13/1827; F02B 37/00; F02B 37/025; F16J 15/0818; Y02T 10/12
See application file for complete search history.

(56) References Cited

U.S. PATENT DOCUMENTS 5,406,795 A * 4/1995 Raub .................. F01D 9/026
60/605.1
5,636,515 A * 6/1997 Matsumoto ............ F01N 13/10
277/591
(Continued)

FOREIGN PATENT DOCUMENTS

CN 102108914 A 6/2011
CN 102317611 A 1/2012
(Continued)

OTHER PUBLICATIONS

International Search Report and Written Opinion of the International Searching Authority, PCT/EP2017/001755, dated May 7, 2018, 8 pages.
(Continued)

*Primary Examiner* — Jesse S Bogue
(74) *Attorney, Agent, or Firm* — Sage Patent Group

(57) ABSTRACT

The invention relates to a sealing gasket, for sealing a connection between an exhaust manifold and a turbine of a vehicle, the sealing gasket comprising two flow passage openings separated by a dividing wall and a first sealing portion extending around the two openings. The sealing gasket includes at least a second sealing portion extending around one of the two openings, and preferably a third sealing portion extending around the other of the two openings.

12 Claims, 4 Drawing Sheets

(51) Int. Cl.
  *F02B 37/00* (2006.01)
  *F16J 15/08* (2006.01)
  *F02B 37/02* (2006.01)

(56) References Cited

U.S. PATENT DOCUMENTS

| | | | | |
|---|---|---|---|---|
| 6,974,137 | B2* | 12/2005 | Beutter | F01N 13/10 |
| | | | | 277/594 |
| 7,401,790 | B2* | 7/2008 | Sadowski | F16J 15/122 |
| | | | | 277/592 |
| 8,474,251 | B2* | 7/2013 | Beyer | F02F 1/40 |
| | | | | 60/321 |
| 8,500,131 | B2* | 8/2013 | Schweiger | F01N 13/1827 |
| | | | | 277/594 |
| 8,919,121 | B2 | 12/2014 | Schlemmer-Kelling | |
| 9,010,110 | B2* | 4/2015 | Grossmann | F01N 13/1827 |
| | | | | 60/602 |
| 9,181,848 | B2 | 11/2015 | Smith et al. | |
| 9,347,361 | B2* | 5/2016 | Murakami | F01N 13/1827 |
| 2006/0131817 | A1* | 6/2006 | Kerelchuk | F16J 15/0825 |
| | | | | 277/592 |
| 2008/0143060 | A1* | 6/2008 | Casler | F16J 15/0818 |
| | | | | 277/654 |
| 2009/0026009 | A1* | 1/2009 | Itoh | F01N 13/107 |
| | | | | 181/227 |
| 2012/0227698 | A1* | 9/2012 | Tripathy | F02F 11/002 |
| | | | | 123/193.1 |
| 2016/0040783 | A1* | 2/2016 | Kullen | F01N 13/08 |
| | | | | 277/608 |
| 2016/0223085 | A1* | 8/2016 | Yamazaki | F16J 15/0825 |

FOREIGN PATENT DOCUMENTS

| | | |
|---|---|---|
| CN | 203067776 U | 7/2013 |
| CN | 105041438 A | 11/2015 |
| DE | 102011054354 A1 | 4/2013 |
| DE | 102013011368 A1 | 1/2015 |
| FR | 2921696 A1 | 4/2009 |
| WO | 2017198316 A1 | 11/2017 |

OTHER PUBLICATIONS

Chinese First Office Action dated Jun. 16, 2021 for Chinese Patent Application No. 201780097837.4, 18 pages (including English translation).

* cited by examiner

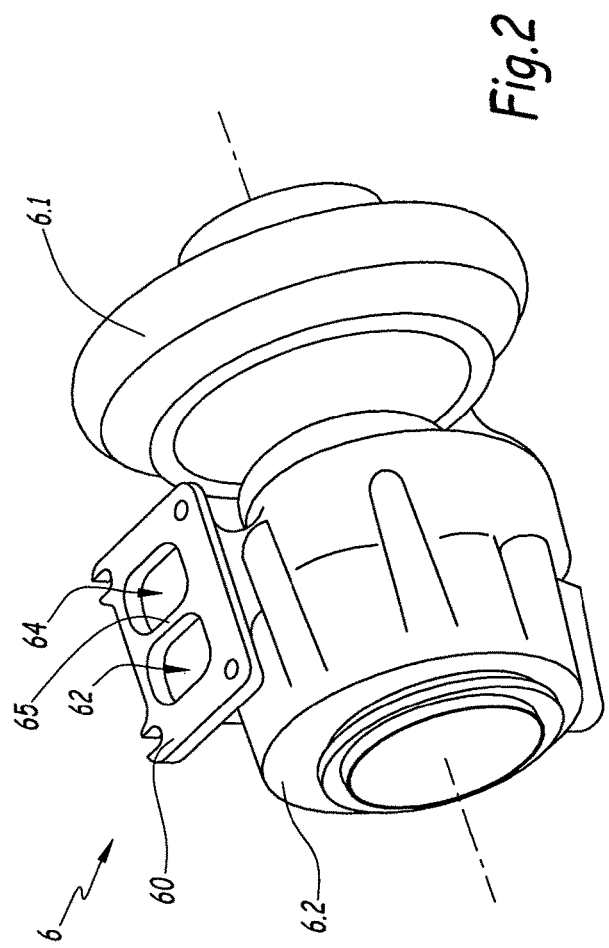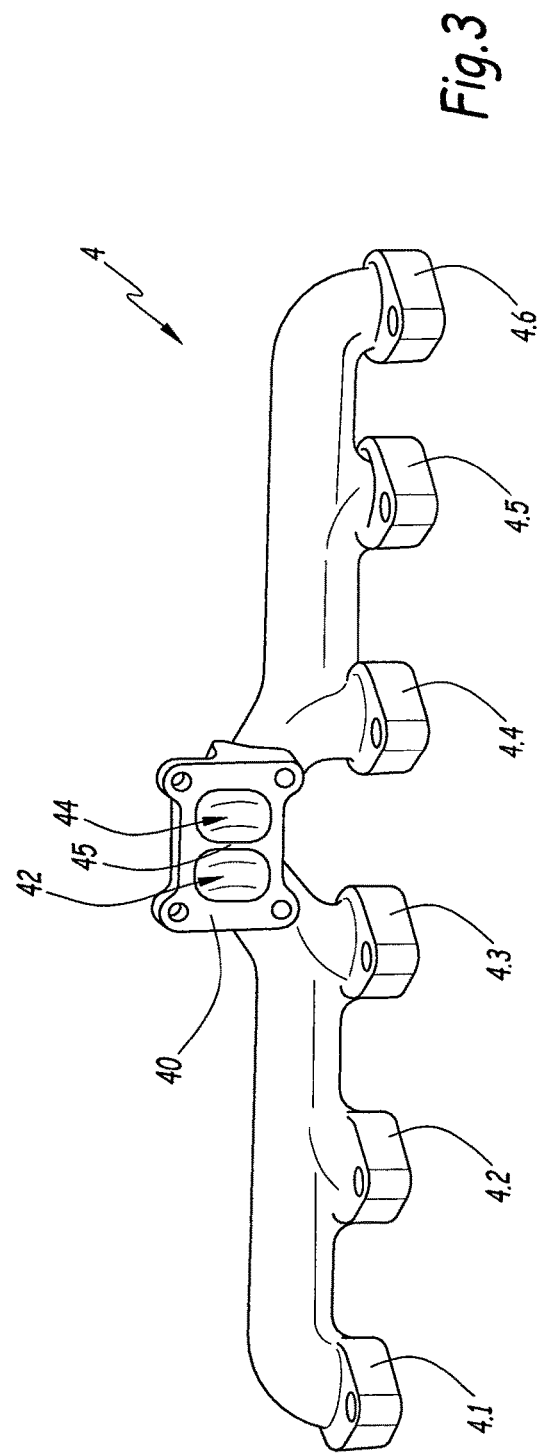

SEALING GASKET, FOR SEALING THE CONNECTION BETWEEN AN EXHAUST MANIFOLD AND A TURBINE

CROSS REFERENCE TO RELATED APPLICATIONS

This application is a 35 U.S.C. § 371 national stage application of PCT International Application No. PCT/IB2017/001755 filed on Dec. 20, 2017, the disclosure and content of which is incorporated by reference herein in its entirety.

TECHNICAL FIELD

The present invention concerns a sealing gasket, for sealing the connection between an exhaust manifold and a Turbine.

BACKGROUND

In the truck industry, turbochargers are commonly used with Diesel cycle internal combustion engines. A turbocharger is a turbine-driven device that increases the efficiency and the power of an internal combustion engine by forcing extra air into the combustion chamber. Typically, a turbocharger is powered by a turbine driven by the hot exhaust gas of the engine.

In most of the cases, the turbine is a fixed geometry turbine that includes a flange provided with a dividing wall to separate the flow of exhaust gases in two flows. Typically, considering a six-cylinder manifold, exhaust gases coming from the first three cylinders are separated from exhaust gases coming from the three other cylinders. A comparable flange is provided on the exhaust manifold. The separation of the exhaust gases in two separate flows helps reducing fuel consumption.

Most of the time, the exhaust manifold and the turbine are two different parts, meaning that the connection between the two flanges needs to be sealed. To this end, one uses a gasket, which is often referred to as a sealing gasket. This gasket includes two flow passage openings separated by a dividing wall. In operation, exhaust manifold and turbocharger dividing walls are subjected to high temperatures, in particular when a stabilized phase is reached, i.e. after long full load running. The hottest part of exhaust manifold and turbocharger are dividing walls as they are in contact with both hot gas flows circulating through exhaust manifold and turbocharger openings and as it is not in contact with ambient air. The thermal expansion of the dividing walls is then greater than for the rest of flanges, which causes contact pressure between dividing walls. This contact pressure reduces the contact pressure of the gasket on flanges, which may cause leakage issues.

One basic solution to this problem is to delete the dividing wall portion of the gasket between the two openings, making a big large opening in the gasket. However, two disadvantages result from this solution. A first one is that the two flows of exhaust gas may communicate at the interface between the manifold and the turbine, creating losses of pulse energy and increasing full consumption. A second one is that the exhaust manifold and turbo dividing walls are locally hotter, which may cause cracks.

The invention intends to remedy these drawbacks by proposing a new gasket design, with which there is no risk of gas communication at the interface between the manifold and the turbine and with which there is less risk of leakages due to the thermal expansion of dividing walls.

SUMMARY

To this end, the invention concerns a sealing gasket, for sealing a connection between an exhaust manifold and a turbine of a vehicle, the sealing gasket comprising two flow passage openings separated by a dividing wall and a first sealing portion extending around the two openings. The sealing gasket comprises at least a second sealing portion extending around one of the two openings, and preferably a third sealing portion extending around the other of the two openings.

EP 2 818 661 discloses an example of a sealing gasket between an exhaust manifold and a turbine. The sealing gasket includes a sealing portion extending around the two openings of the gasket. This sealing portion includes a seal ring housed in a ring-shaped groove milled into the sealing gasket. The problem of this gasket is that it does not efficiently prevent gas communication at the interface between the turbine and the manifold.

CN 20 30 67776 discloses another example of a sealing gasket, which is mounted between a turbo-supercharger and an exhaust manifold of a diesel engine. The gasket is provided with two flow passage openings and with two sealing ribs extending each around a respective opening of the gasket. The problem of this gasket is that it does not efficiently prevent gas leakages.

Thanks to the invention, the first sealing portion extending around the two openings enables avoiding as far as possible the gas leakages due to the thermal deformation of exhaust manifold and turbocharger flanges and the second sealing portion enables avoiding as far as possible the two flows of exhaust gas to communicate at the interface between the turbine and the manifold. In other words, the sealing functions of the gasket are enhanced in comparison with prior art sealing gaskets. The first and the second sealing portion are designed to compensate different deformation.

Further advantageous features of the gasket are defined below:
- At least one sealing portion is a sealing bead that is integral with the rest of the gasket or that is a removable seal ring.
- Each sealing portion is a sealing bead, that is integral with the rest of the gasket or that is a removable seal ring.
- The sealing gasket is in the form of a plate and sealing portions protrude at least on one side of the plate.
- Sealing portions are provided on both sides of the plate.
- The second sealing portion and the third sealing portion are two sealing beads that are each integral with the rest of the gasket and that are not merged in the region of the dividing wall.
- The gasket is made by stamping or molding.
- The first sealing portion and the second sealing portion are designed differently to compensate different deformation.
- The first sealing portion on the one hand and the second sealing portion and the third sealing portion on the other hand are designed differently to compensate different deformation.
- The first sealing portion has a height measured over the thickness of the sealing gasket, that is higher than the height of the second sealing portion. Preferably, when the sealing gasket comprises a third sealing portion, the first sealing portion has a height, measured over the thickness of the sealing gasket, that is higher than the heights of the second and third sealing portions.

The first sealing portion has a height, measured over the thickness of the sealing gasket, that is at least 20% higher than the height of the second sealing portion. Preferably, when the sealing gasket comprises a third sealing portion, the first sealing portion has a height, measured over the thickness of the sealing gasket, that is at least 20% higher than the heights of the second and third sealing portions.

The height of the first sealing portion is determined such that in a compressed state of the first sealing portion, the height of the first sealing portion 86, measured over the thickness of the sealing gasket, is equal to the height of the second or third sealing portion when compressed plus a height corresponding to the maximum amplitude of deformation of the second or third sealing portion at the dividing wall such as met under operating conditions.

The invention also concerns an internal combustion engine comprising an exhaust manifold, a turbine, and a sealing gasket as previously defined, sealing the connection between the turbine and the manifold.

The invention also concerns a vehicle, such as a truck or a tractor truck, comprising an internal combustion engine as defined above.

BRIEF DESCRIPTION OF THE DRAWINGS

The invention will be better understood from reading the following description, given solely by way of two non-limiting examples and with reference to the appended drawings, which are schematic depictions, in which:

FIG. 2 is a perspective view of the turbine;

FIG. 3 is a perspective view of the gas exhaust manifold;

DETAILED DESCRIPTION OF EXAMPLE EMBODIMENTS OF THE INVENTION

Figure 1:
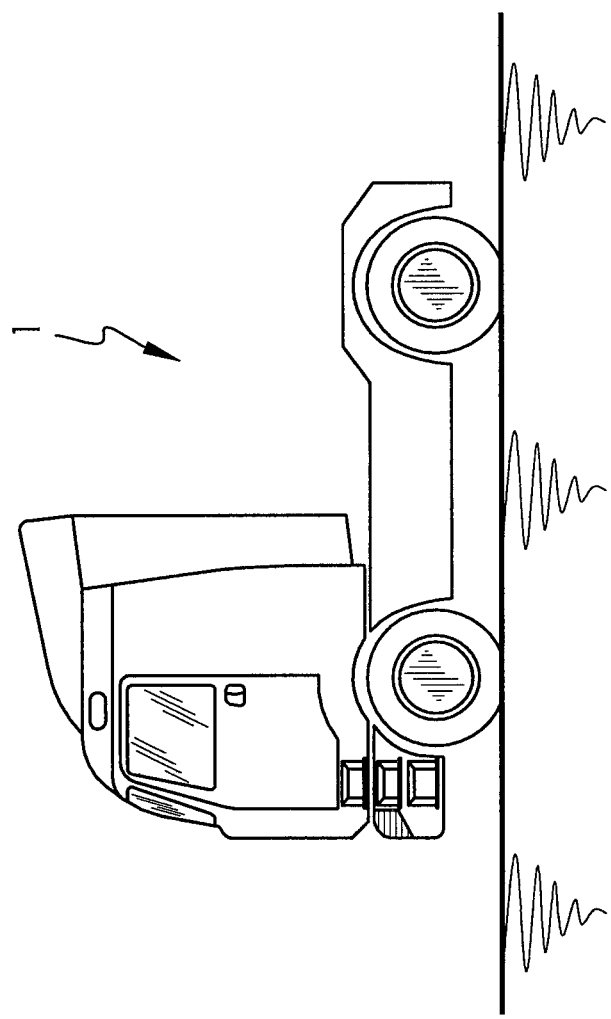
FIG. 1 is a side view of a vehicle, in particular a truck tractor, comprising a gas exhaust manifold and a turbine.

FIG. 1 represents, in side view, a vehicle which is, in the example, a tractor truck 1. However, in a non-represented alternative embodiment, the vehicle may be different from a tractor truck. For instance, the vehicle may be a light, medium or heavy-duty vehicle, a utility vehicle, an autonomous vehicle, etc.

The tractor truck 1 includes an internal combustion engine comprising an engine block (not represented) including a plurality of combustion cylinders, typically six cylinders.

The engine further includes an exhaust gas manifold 4, represented on FIG. 3, which collects the gas exhausting from the combustion chambers of the engine cylinders. Typically, the exhaust gas manifold 4 includes six inlets 4.1, 4.2, 4.3, 4.4, 4.5 and 4.6 to be respectively connected to the combustion chambers of the engine. Exhaust gases coming from the first three cylinders, i.e. flowing in the inlets 4.1 to 4.3, are separated from exhaust gases coming from the three other cylinders, i.e. flowing in the inlets 4.4 to 4.6. Accordingly, the manifold 4 includes two gas flow channels 42 and 44 that open on a connecting flange 40 of the manifold 4. Both gas flow channels 42 and 44 are separated by a dividing wall 45 of the manifold 4. The dividing wall 45 extends up to the connecting flange 40.

The engine also includes a turbocharger 6 (cf. FIG. 2) comprising a compressor part 6.1 and turbine part 6.2 that can be, for instance, a fixed geometry turbine (FGT). Turbine 6.2 converts the thermal and kinetic energies of the exhaust gases into a mechanical torque. Typically, the generated mechanical torque may be used to power the compressor part 6.1. According to an alternative of the invention that is not represented, the turbine 6.2 is not necessary part of a turbocharger and can be used to power another vehicle equipment such as, for instance, a pump. The turbine 6.2 includes two inlets gas flow channels 62 and 64, to be connected respectively with the two gas flow channels 42 and 44 of the exhaust gas manifold 4 via a connecting flange 60 of the turbine 6.2 and the connecting flange 40 of the manifold 4.

Figure 5:
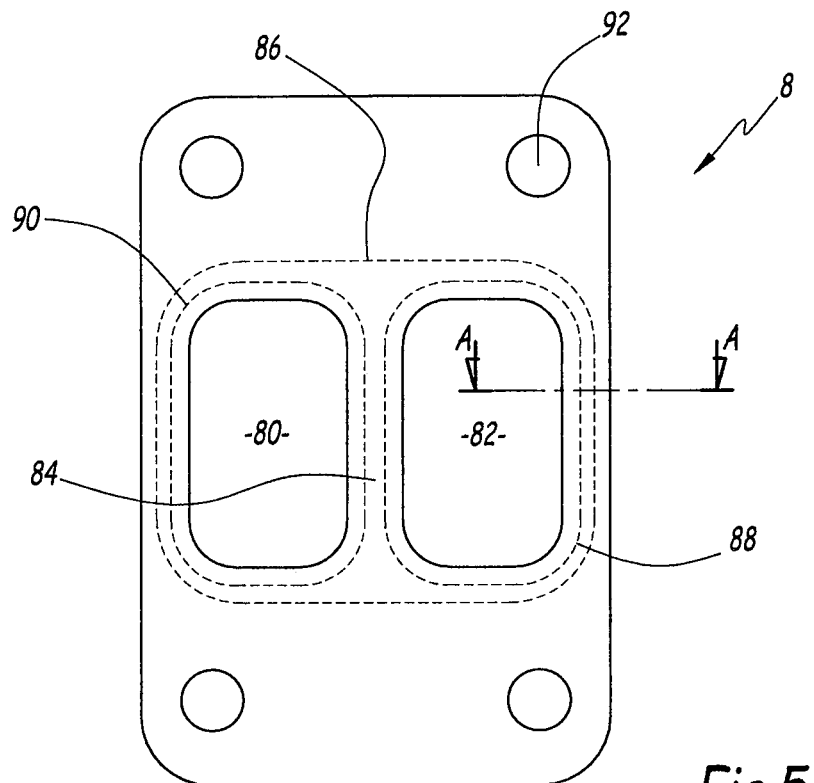
FIG. 5 represents a schematic view of a first embodiment of the gasket.

Both inlets gas flow channels 62 and 64 open on the connecting flange 60. The connecting flange 60 is provided with a dividing wall 65 to separate the inlets of the gas flow channels 62 and 64 and to therefore separate the flow of exhaust gases in two flows. A gasket 8, represented on FIG. 5, is used for sealing the connection between the flange 60 of the turbine and the flange 40 of the manifold 4. The gasket 8 is in the form of the turbine flange 60 and is made of a single steel layer or of several steel layers. The gasket 8 comprises two flow passage openings 80 and 82 separated by a dividing wall 84 corresponding to the dividing walls 45 and 65, respectively of the manifold 4 and of the turbine 6.2.

Preferably, there are only two flow passage openings. In the example, the two openings are of rectangular shape. However, any other shape is possible. Typically, the openings 80 and 82 may be of circular shape.

Advantageously, the gasket 8 delimits holes 92 for the passage of fixing bolts (not represented).

The gasket 8 includes a first sealing portion 86, represented schematically with broken lines, extending around the two openings 80 and 82. Preferably, the sealing portion 86 is a sealing bead that is integral with the rest of the gasket. In particular, this sealing bead forms a rectangle surrounding the openings 80 and 82.

The sealing gasket comprises also a second sealing portion 88, represented schematically with broken lines, extending around the opening 82. The sealing gasket may comprise a third sealing portion 90, also represented schematically with broken lines, extending around the opening 80. Preferably, the sealing portions 88 and 90 are two distant sealing beads that are integral with the rest of the gasket 8. In particular, each sealing bead forms a rectangle surrounding the opening 80 or 82. Alternatively, the sealing portions 86, 88 and 90 may be of different shape. Typically, the sealing portions 86, 88 and 90 may be of circular shape.

Advantageously, sealing portions 88 and 90 are surrounded by the sealing portion 86.

Given that the sealing beads 86, 88 and 90 are integral with the rest of the gasket 8, the gasket 8 may be easily manufactured in one-piece, for example by stamping. Typically, the gasket 8 is made of metal, for example of stainless steel layers.

Figure 4:
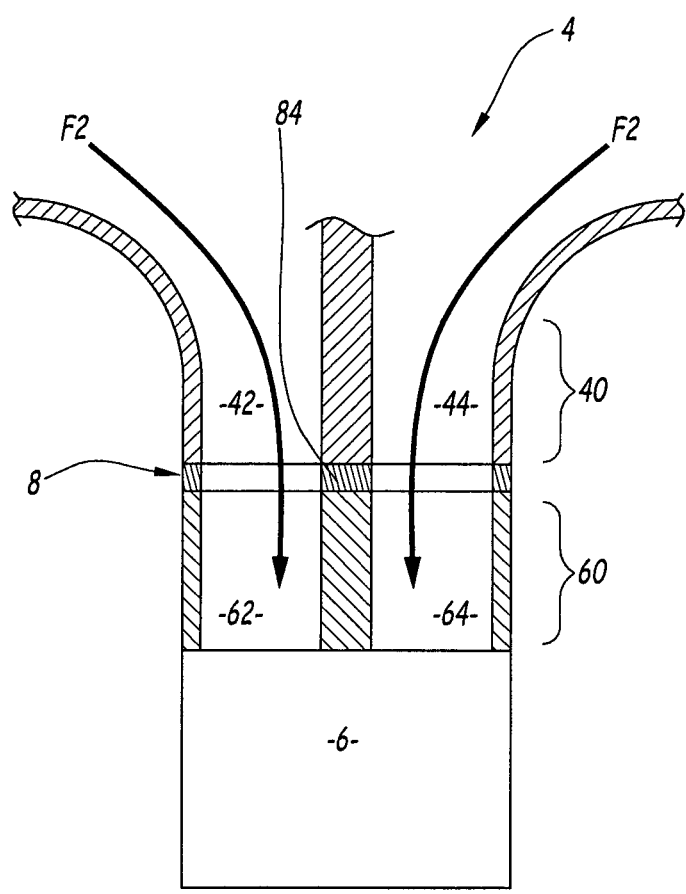
FIG. 4 is a scheme representative of the connection between the manifold and the turbine, the sealing of this connection being ensured a by a sealing gasket.

On FIG. 4, arrows F2 represent the direction of the two respective gas flows coming from the manifold 4 and entering into the turbine 6.2. As shown on this figure, in assembled state, the channel 42 communicates in a gas-tight manner with channel 62 and channel 44 communicates in a gas-tight manner with channel 64.

For the clarity of the drawing, the gasket 8 is represented on FIG. 4 but the sealing beads are not represented.

Preferably, the first sealing portion 86 and the second sealing portion 88 are designed differently, to compensate different deformation. When the sealing gasket 8 comprises a further third sealing portion 90, the first sealing portion 86 on the one hand and the second and the third sealing portions 88, 90 on the other hand are designed differently to compensate different deformation.

Figure 7:
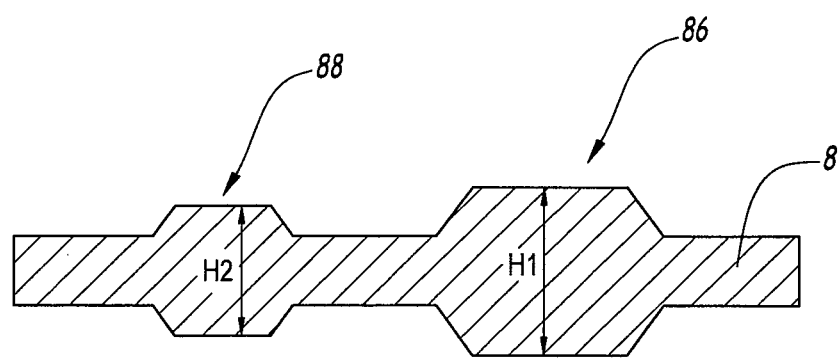
FIG. 7 represents a partial sectional view of the gasket according to the cut line A-A of FIGS. 5 and 6

According to an improvement of the sealing gasket 8, the first sealing portion 86 has a height H1 (FIG. 7) measured over the thickness of the plate and when it is in a rest state, that is to say in non-compressed state, that is higher than the height H2 of the second sealing portion 88. When the sealing gasket 8 comprises a further third sealing portion 90, the first sealing portion 86 has a height H1, measured over the thickness of the plate, (when it is not compressed) that is higher than the heights H2, H3 of the second and third sealing portions 88, 90.

Owing to this, the thermal expansion of the dividing walls 45 and 65, that is greater than for the rest of the flanges 40, 60, is compensated by the provision on the gasket 8 of a first sealing portion 86 having a height H1 (FIG. 7) measured over the thickness of the plate that is higher than the heights H2, H3 of the second and third sealing portions 88 90. Thanks to that, when the sealing gasket 8 is mounted on an engine and the engine is running, the contact pressure of the gasket 8 between the flange 40 and the flange 60 is maintained in the peripheral zone of the flanges that extends around the two openings 80 and 82 even when the dividing walls 45 and 65 have a greater thermal expansion than the rest of the flanges 40, 60. Consequently, leakage issues can be avoided in this peripheral zone even when the dividing walls 45 and 65 have a greater thermal expansion than the rest of the flanges 40, 60.

Preferably, the first sealing portion 86 has a height H1, measured over the thickness of the plate, that is at least 20% higher than the height H2 of the second sealing portion 88. When the sealing gasket 8 comprises a further third sealing portion 90, the first sealing portion 8 has a height H1, measured over the thickness of the plate, that is at least 20% higher than the heights H2, H3 of the second and third sealing portions 88, 90. For instance, the first sealing portion 86 may have a height H1 that is comprised between 1.8 and 3.6 mm and the second sealing portion 88 and/or the third sealing portion 90 may have a height H2, H3 that is comprised between 1.5 mm and 3 mm.

Preferably, the second sealing portion 88 and the third sealing portion 90 are designed to compensate amplitudes of the thermal deformations of the dividing walls 45 and 65.

Preferably, the height of the first sealing portion 86 is determined such that in a compressed state of the first sealing portion 86, the height h1 of the first sealing portion 86 (measured over the thickness of the sealing gasket 8) is equal to the height h2 or h3 of the second or third sealing portion 88 or 90 when compressed plus a height $H_4$ corresponding to the maximum amplitude A of deformation of the second or third sealing portion 88 or 90 at the dividing wall 84 such as met under operating conditions, that is to say when the sealing gasket 8 is mounted on the engine. Under operating conditions, the amplitude A of deformation of the second or third sealing portion 88 or 90 at the dividing 84 is mainly caused by the thermal deformation of the dividing walls 45 and 65. Preferably, said amplitude A caused by thermal deformations of the dividing walls 45 and 65 is measured between ambient temperature of the exhaust manifold 4 when the engine is stop or just started and high temperatures of the exhaust manifold 4 met during some operations of the engine. The amplitude A is measured according to a direction that is perpendicular to the sealing gasket main surface.

The two sealing beads 88 and 90 are preferably not merged in the region of the dividing wall 84, meaning that there is a double sealing between the two openings 80 and 82 of the gasket 8. Accordingly to this improved arrangement, the gasket 8 according to the invention provides an improved sealing between the two gasket openings 80, 82, i.e. in the region of the dividing wall 84.

Preferably, sealing portions 86, 88 and 90 are provided on both sides of the sealing gasket 8, meaning that a first group of three sealing portions are designed for being in sealing contact with the manifold flange 40 on one side of the gasket 8 and that a second group of three identical sealing portions are designed for being in sealing contact with the turbine flange 60 on the other side of the gasket 8.

Figure 6:
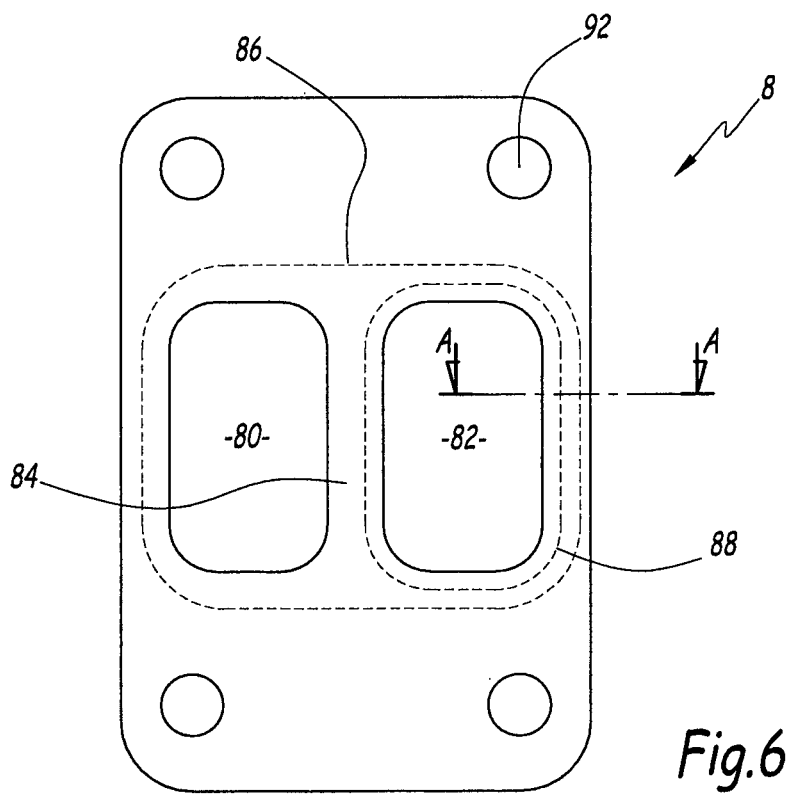
FIG. 6 represents a schematic view of a second embodiment of the gasket.

Alternatively, and as shown on FIG. 6, the gasket 8 may include only two sealing portions 86 and 88, i.e. two sealing beads. In other words, the sealing portion 90 (or 88) is purely optional.

In a non-represented alternative embodiment, at least one sealing portion among the first sealing portion 86, the second sealing portion 88 and the third sealing portion 90 is a removable seal ring, typically a V-ring in steel. In particular, the seal ring may be received in a groove of the gasket.

The features of the depicted embodiments and of the non-represented alternative embodiments may be combined together to generate new embodiments of the invention.

The invention claimed is:

1. Sealing gasket, for sealing a connection between an exhaust manifold and a turbine of a vehicle, the sealing gasket comprising two flow passage openings separated by a dividing wall and a first sealing portion extending around the two openings, wherein the sealing gasket comprises at least a second sealing portion extending around one of the two openings, wherein each sealing portion is a sealing bead that is integral with the rest of the gasket, wherein the gasket is made of a single steel layer.

2. Sealing gasket according to claim 1, wherein the sealing gasket is in the form of a plate and sealing portions protrude at least on one side of the plate.

3. Sealing gasket according to claim 2, wherein sealing portions are provided on both sides of the plate.

4. Sealing gasket according to claim 1, wherein the gasket is made by stamping or molding.

5. Sealing gasket according to claim 1, wherein the first sealing portion and the second sealing portion have different heights to compensate different deformation.

6. Sealing gasket according to claim 1, wherein the first sealing portion has a height measured over the thickness of the sealing gasket, that is higher than the height of the second sealing portion, and in that, when the sealing gasket comprises a third sealing portion, the first sealing portion has a height, measured over the thickness of the sealing gasket, that is higher than the heights of the second and third sealing portions.

7. Sealing gasket according to claim 1, wherein the first sealing portion has a height, measured over the thickness of the sealing gasket, that is at least 20% higher than the height of the second sealing portion, and in that, when the sealing gasket comprises a third sealing portion, the first sealing portion has a height, measured over the thickness of the sealing gasket, that is at least 20% higher than the heights of the second and third sealing portions.

8. Internal combustion engine, comprising an exhaust manifold, a turbine, and a sealing gasket according to claim 1, sealing the connection between the turbine and the manifold.

9. Vehicle, such as a truck or a tractor truck, comprising an internal combustion engine according to claim 1.

10. Sealing gasket according to claim 1, further comprising a third sealing portion extending around the other of the two openings.

11. Sealing gasket according to claim 10, wherein the second sealing portion and the third sealing portion are two sealing beads that are each integral with the rest of the gasket and that are not merged in a region of the dividing wall.

12. Sealing gasket according to claim 10, wherein the first sealing portion is configured to compensate a first deformation, and the second sealing portion and third sealing portion are configured to compensate a second deformation different from the first deformation.

* * * * *